United States Patent [19]

Esmaeili et al.

[11] Patent Number: 6,067,397
[45] Date of Patent: May 23, 2000

[54] METHOD AND DEVICE FOR PRODUCING A SHARP PICTURE OF AN END REGION OF AN OPTICAL FIBER RIBBON

[75] Inventors: Sasan Esmaeili, Solna; Kent Klevby; Bernt Sundström, both of Hässelby, all of Sweden

[73] Assignee: Telefonaktieoblaget LM Ericsson, Stockholm, Sweden

[21] Appl. No.: 09/082,962

[22] Filed: May 22, 1998

[30] Foreign Application Priority Data

May 23, 1997 [SE] Sweden ................................... 9701955

[51] Int. Cl.⁷ ..................................................... G02B 6/00
[52] U.S. Cl. ............................................................ 385/147
[58] Field of Search ................................ 385/96, 97, 98, 385/147

[56] References Cited

U.S. PATENT DOCUMENTS

| 4,911,524 | 3/1990 | Itoh et al. | 385/95 |
| 5,158,591 | 10/1992 | Onodera et al. | 65/152 |
| 5,313,542 | 5/1994 | Castonguay | 385/115 |

FOREIGN PATENT DOCUMENTS 0 320 978   6/1989   European Pat. Off. .

*Primary Examiner*—Akm E. Ullah
*Attorney, Agent, or Firm*—Burns, Doane, Swecker & Mathis, L.L.P.

[57] ABSTRACT

When imaging the end region of an optical fiber ribbon including individual optical fibers cameras are used which have lens systems and arrays of light sensitive CCD-elements which are connected through an image processing unit to a display monitor. The optical axes of the lens systems form an oblique angle, for example between 45 and 60°, to the plane through the optical fibers, so that the optical axes have an angle of for instance between 60 and 90° to each other, in order to obtain pictures having sufficient amounts of information in regard of the positions of the fiber ends. To achieve a sharp picture of all of the fiber ends the CCD-array of a camera is located in an oblique angle to the optical axis of the lens system. This oblique angle is so selected, that the CCD-array is located in the plane, in which the pictures of the individual optical fibers are located. Conventionally the CCD-array would be placed perpendicularly to the optical axis of a camera, resulting in that then substantially only one fiber can be sharply imaged.

15 Claims, 2 Drawing Sheets

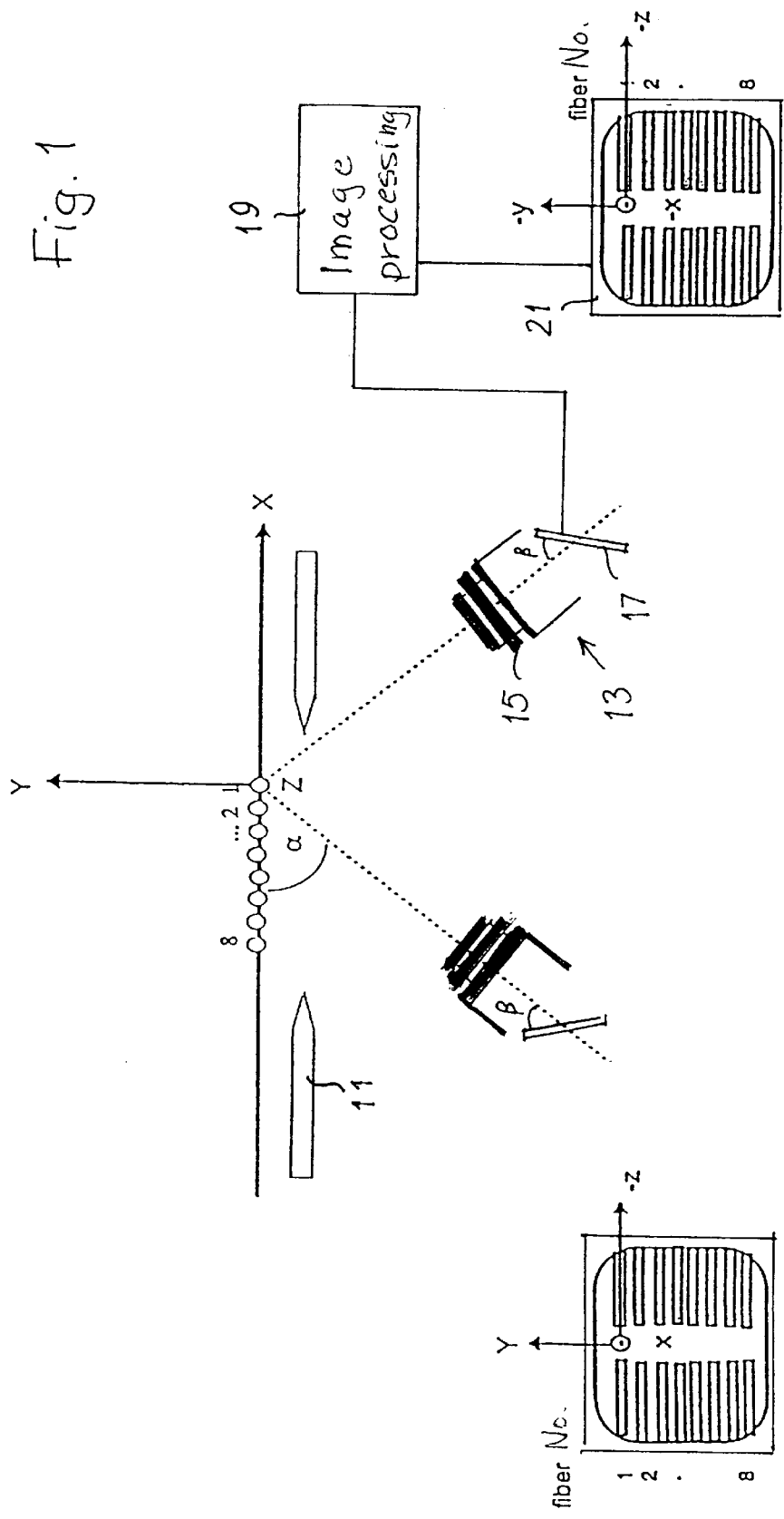

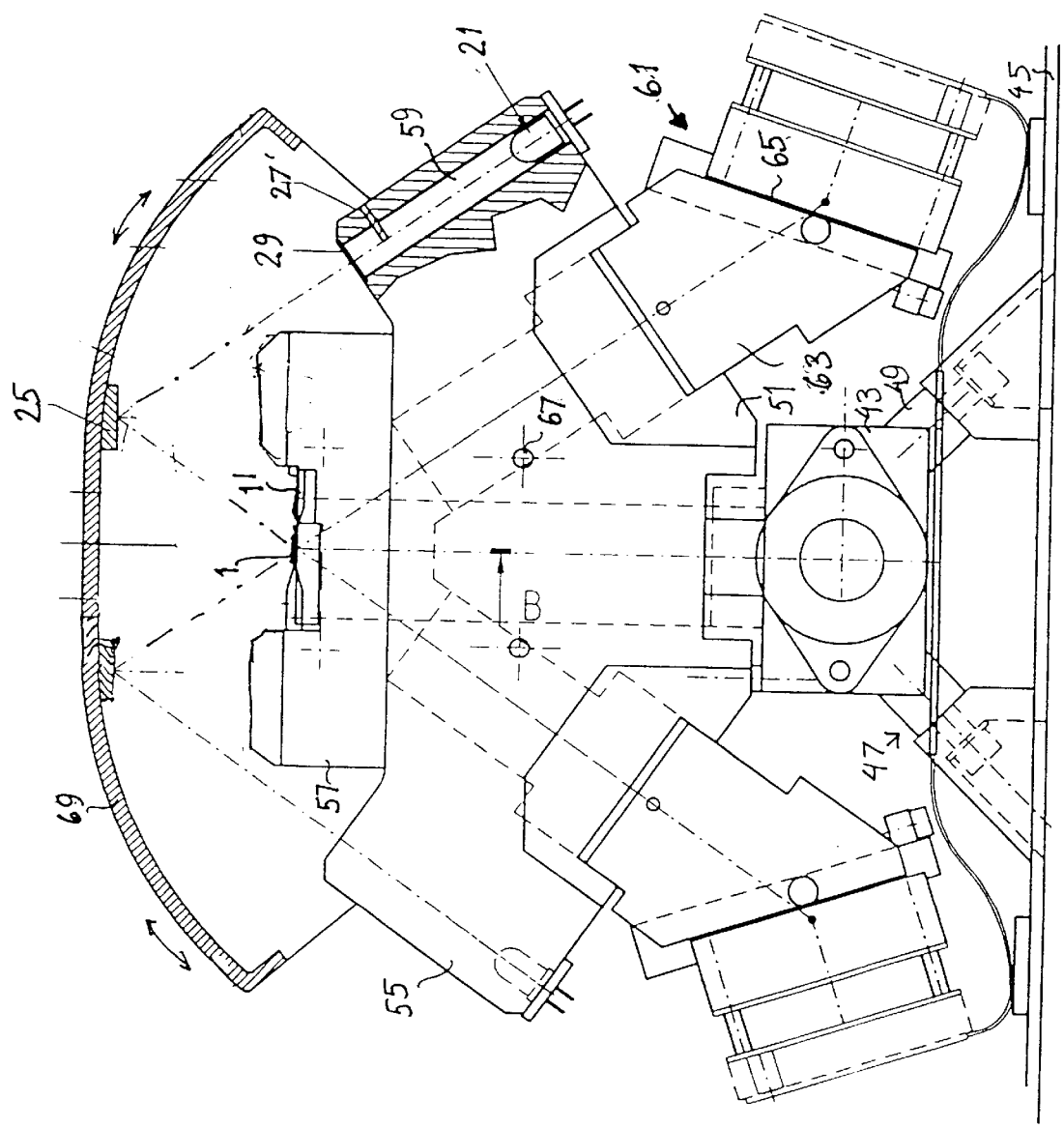

METHOD AND DEVICE FOR PRODUCING A SHARP PICTURE OF AN END REGION OF AN OPTICAL FIBER RIBBON

The present invention relates to a method and device for imaging the end region of a cut-off optical fiber ribbon, particularly in conjunction with splicing the fiber ribbon to another fiber ribbon by means of welding.

BACKGROUND

In order to measure different geometric quantities in a welding device for optical fiber ribbons such as fiber gaps, fiber diameters, offset between the exterior sides of the claddings and between the fiber cores, etc., the positions of the fibers in the xyz-coordinate system of the machine must be determined. In order to be able to make this, the ends of the fibers must be observed in at least two directions, which are well separated from each other or equivalently two pictures must be taken in two such directions. This implies that the end region of a fiber ribbon must be observed or imaged in directions, which are located obliquely to a plane passing through the end portion of the fiber ribbon. It results in its turn that the individual fiber ends have different distances to the observing person or to an optical system in a camera, so that they cannot simultaneously be observed or depicted in full sharpness, since the pictures of the fiber ends are not located in a plane perpendicular to a line from the object to the observer or to the optical axis of the optical system.

SUMMARY

It is an object of the invention to provide a method and a device for sharply depicting the end region of an optical fiber ribbon, in particular for automatic evaluation of the positions of the ends of the individual optical fibers included in a fiber ribbon in connection with welding of fiber ribbons to each other.

The problem, which the invention intends to solve, is thus to find a method of obtaining a sharp picture of the end region of a fiber ribbon in connection with welding, in which this picture is to give sufficient information on the position of the end region, both laterally and vertically. Since the end region is a substantially flat region the imaging must be made in an oblique angle in relation to the plane of the end region, which gives, using conventional optical systems, an unsharpness or lack of sharpness in a captured picture.

When imaging the end region of an optical fiber ribbon comprising parallel optical fibers or equivalently end regions of a plurality of optical fibers placed with their end portions in parallel to and next to each other, so that the longitudinal axes of the end portions are located in one single plane, a camera is used comprising a lens system and a light sensitive means, which comprises light sensitive elements arranged in a plane. The optical axis of the lens system and generally a central line in a light beam from the end region or the end regions respectively to the lens system forms an oblique angle to the plane extending through the end regions of the optical fibers, in particular an angle between 45 and 60° and preferably between 45 and 55°. Preferably two identically, symmetrically placed cameras are used, so that the optical axes of their lens systems have an angle to each other of for example between 75 and 90°. Thereby pictures can be obtained, which contain sufficient information regarding the positions of the fiber ends so that it will be possible to position the fiber ends such as for welding them to each other. In order to obtain a sharp picture of all fiber ends the plane of the light sensitive elements in a camera is arranged in a suitable oblique angle in relation to the optical axis of the lens system of this camera or in relation to the above mentioned centre line. This oblique angle is so selected, that the plane extending through the light sensitive elements passes through the pictures of the individual optical fibers, such as they are obtained by the lens system of the camera.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a schematic picture of a fiber ribbon welding device comprising an optical system for imaging end regions of inserted fiber ribbons, and FIG. 2 is a side view of a fiber ribbon welding device.

DETAILED DESCRIPTION

In FIG. 1 parts of a fiber welding device are schematically shown. End surfaces of a plurality of optical fibers, which in the case illustrated are eight—advantageously the devices is also used for fiber ribbons having twelve included fibers—and are numbered from 1 to 8 and which are kept together to form a fiber ribbon, are shown to be located along an x-axis, which in FIG. 1 is located horizontally in the plane of the paper. In order to weld the fibers electrodes 11 are located in the direction of the x-axis somewhat below the plane extending through the fiber ends. When welding the fibers the electrodes can be placed in a suitable way in relation to the end surfaces of the fibers and then between the electrodes 11 an electric arc is formed, which heats the end surfaces of the fibers and welds them to other fibers, not shown, also suitably kept together to form a fiber ribbon. The fibers are assumed to be located along a z-coordinate axis, which in FIG. 1 is perpendicular to the plane of the paper, and further a y-coordinate axis is arranged, which is perpendicular to both the longitudinal direction of the fibers, i.e. to the z-axis, and in addition to the x-axis and is illustrated in FIG. 1 as located vertically in the plane of the paper.

In order to determine the positions of the fibers and in particular the positions of the end surfaces thereof and possibly other parameters of the fiber ends two cameras 13 are used, which comprise optical lens systems shown at 15. These lens systems are arranged having their optical axes located obliquely to the xz-plane, i.e. to the plane which passes through the end regions of the fibers Nos. 1–8, and forms an acute angle α thereto. The optical axes can be assumed to be located in the same xy-plane, i.e. in the same vertical plane as seen in FIG. 1, so that the projections of the optical axes on the plane extending through the fiber ends, the xz-plane, are located perpendicularly to the longitudinal direction of the fiber ends, the z-direction. The axes should most preferably be located perpendicularly to each other in order to provide largest possible information on the positions of the fiber ends. This gives an angle α of 45°. It can be difficult to practically achieve such an angle in an actual welding device, in which a lot of further devices are arranged. However, an angle α in the interval of 45–60° generally provides sufficiently good information.

The cameras 13 furthermore comprise light detectors 17 including a set of light sensitive elements, for example the CCD-elements, arranged in a single plane. The light sensitive elements are connected to an electronic image processing unit 19 and therethrough to a display monitor 21, so that the captured picture can be displayed thereon. Since the end regions of the fibers Nos. 1–8 are located obliquely and not perpendicularly to the optical axes of the cameras 13, the pictures of the fiber ends produced by the lens systems 15 are not located in the same plane perpendicular to the respective optical axis, but they are located in a plane, which forms an angle β thereto. In order to obtain a sharpness of all regions of the picture then also the plane comprising the light sensitive elements of the light detectors 17 is arranged in this angle β to the optical axis and furthermore at a correct distance of the optical system, so that the image points obtained from each of the fiber ends are located in this plane.

The relation between the angles is given by $$\tan \beta = \frac{1 + \frac{1}{M_0}}{1 + M_0} \cdot \tan \alpha \qquad (1)$$

where $M_0$ is the magnification of the optical system 15.

Owing to the different distances from the depicted objects No. 1–8 to the optical systems 15 the magnification of the objects becomes different in the imaging on the light sensitive detectors 17, but this is not obstructing, since a calibration of a captured picture can easily be made and since the relative position of fiber ends placed opposite each other in many cases is the fact of interest. In order to obtain similarly oriented pictures on the display monitors 21, the electronic coupling between the light detecting array 17 and the display monitor 21 is made differently for them, since otherwise one of the display monitors will show fiber No. 1 at the top and the other display monitor fiber No. 8 at the top.

In FIG. 2 a detailed view, as seen partly in a sectional view, of a fiber welding device is shown, in particular intended for welding optical fiber ribbons, in which the view/section is taken substantially centrally through the device and the view is seen in parallel to and the section parts are taken perpendicularly to the direction of the fibers which are to be welded to each other. In this device an oblique arrangement of the surface comprising light sensitive CCD-elements according to the description above is used. The components of the device are carried by an elongated frame bar 43 having a longitudinal direction coinciding with the fiber direction and having a rectangular cross section, which is supported by a base 45 through four oblique legs 47. The legs 47 can comprise elastic cushioning intermediate pieces such as 49. Centrally on the frame bar 43 a central frame 51 is attached and projects therefrom. The central frame 51 generally has an isosceles triangular shape having its point between the equal legs directed downwards towards the frame bar 43 and comprising a substantially horizontal and flat top surface and further comprising two symmetrically placed projections or triangular halves 55. They project perpendicularly to the direction of the fibers and are cut off at their triangular points by surfaces, which form straight angles to the oblique sides of the triangular shape. The projections 55 carry light sources and cameras, see hereinafter.

The horizontal top surface of the central frame 51 carries an electrode housing 57, to which parts, not shown, are attached, which are required for retaining the ends of the fibers and for the alignment thereof with each other, and further the welding electrodes 11. At the exterior sides of the projections 55 oblique cylindrical through-holes 59 are provided, which extend in parallel to the exterior cut-off sides of the projections and the axes of which are located in a vertically transverse plane, in which also the end surfaces of the fibers are located which are to be spliced to each other. The axes of the holes 59 and the exterior cut-off surfaces of the projections 55 are located in an angle of between 30 and 45° in relation to a vertical plane, in the preferred case in an angle between 35 and 40° and preferably about 37°. In the holes 59 light passes from light sources 23 such as light-emitting diodes 21 arranged in the bottom end of the holes.

Light from the light-emitting diodes 21 passes in the holes 59 towards the top ends thereof but is first reduced in intensity by diaphragms 27', which are formed by plates, which perpendicularly project into the interior of the holes 59 and are arranged in slots in the central frame 51 at a distance from the top openings thereof, which has a magnitude approximately equal to the diameter of the holes 59. The diaphragm plates 27' have a straight interior or lower edge and project in to approximately the centre of the holes 59, so that the light is allowed to pass through an approximately semi-circular aperture. At the top openings of the holes 59 light scattering or diffusing means 29 are located, such as suitable gratings, in order to produce a uniform background illumination.

Camera units 61 are with their front portions inserted in corresponding holes in the oblique surfaces of the inverted triangular shape of the central frame. The camera unit 61 has a front portion 63, which contains their optical systems. The optical axes of the optical systems are parallel to the axes of the holes 59 and extend through the longitudinal axis of the fibers or fiber ribbons which are to be spliced to each other exactly in the splicing plane. The continuations of the holes for the camera units 61 extend up to the bottom side of the electrode housing 57 in order for light from the splicing region of the fibers to be imaged by the optical system of the light sensitive elements of the camera units 61. The light sensitive elements are located at the plane 65 and are arranged in an oblique angle and not perpendicularly to the axes of the optical system, where the angle is adapted to give a sharp picture of all individual fibers in fiber ribbons which are to be spliced.

The top portion of the central frame 51 and the electrode housing 57 are protected by two casing halves 69, which are capable of swinging towards and away from each other about shafts 67. At the interior side of the casings, at the top-most portions thereof having approximately horizontal surfaces, the mirrors 25 are arranged having horizontal reflecting surfaces, which are placed so that light rays from the diffusing elements 29 can be mirrored therein and reflected, so that they can enter the optical systems of the camera units 61 and be conducted thereby towards the light sensitive surfaces in the camera units.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of producing a picture of an end region of parallel optical fibers kept together to form a flat optical fiber ribbon or of end regions of several optical fibers having ends placed in parallel to and at each other in a plane, the method comprising the step of imaging the end region or the end regions respectively by a lens system, so that a centre line in a light beam from the end region or the end regions respectively to the lens system forms an oblique angle to a plane extending through the end region or end regions respectively, and the method further comprising the step of capturing the picture in a capturing plane, which is located in an oblique angle in relation to the centre line, this oblique angle being so selected, that the capturing plane is located in an image plane, in which a picture of the end region or the end regions respectively, when being imaged through the lens system, is located, whereby a sharp picture of the imaged end region or end regions is obtained.

2. The method of claim 1, wherein two lens systems are used, the light beams from the end region or the end regions respectively to each of the lens systems having a centre line, which forms an oblique angle to the plane extending through the end region or end regions, and capturing a picture in each lens system in a capturing plane, which forms an oblique angle to the respective centre line, the oblique angle being selected, so that the capturing plane is located in the respective image plane.

3. The method of claim 2, wherein the centre lines are located symmetrically in relation to a longitudinal axis of ends of optical fibers in a region which is to be imaged and in the same oblique angle in relation to the plane extending through of the end region or the end regions.

4. The method of any of claim 2, wherein the centre lines form an angle of between 60–90°, to each other and are located in a plane substantially perpendicular to the longitudinal axis direction of the ends of optical fibers.

5. A device for producing a picture of the end region of parallel optical fibers kept together to form a flat optical fiber ribbon or of end regions of a plurality of optical fibers having ends placed parallel to and at each other in a plane, the device comprising a camera, which includes a lens system and a light sensitive means, the light sensitive means in turn comprising light sensitive elements arranged in a detector plane for producing the picture, a centre line of a light beam from the end region or the end regions respectively to the lens system forming an oblique angle to a plane extending through the end region or end regions respectively, the detector plane forming an oblique angle to the centre line, this oblique angle being so selected, that the detector plane is located in a plane, in which a picture of the end regions or end regions respectively, when being imaged by the lens system, is located, whereby a sharp picture of the end region or end regions respectively is obtained.

6. The device of claim 5, wherein the centre line substantially coincides with an optical axis of the lens system.

7. The device of claim 5, wherein the centre line is located in a plane substantially perpendicular to a longitudinal direction of the end region or the end regions respectively.

8. The device of claim 5, comprising two identical cameras having lens systems and light sensitive means, the cameras being located symmetrically in relation to a longitudinal axis of the end region or end regions respectively, centre lines of light beams from the end region or the end regions respectively to the lens systems forming a same oblique angle to a plane extending through the end region or end regions.

9. The device of claim 8, wherein the centre lines form an angle of between 60 and 90°to each other and are located in one plane substantially perpendicular to a longitudinal direction of the end region or end regions.

10. The method of claim 1, wherein the centre line in the light beam from the end region or end regions respectively to the lens system forms an angle of between 45° and 60°.

11. The method of claim 10, wherein the angle is between 45° and 55°.

12. The method of claim 4, wherein the centre lines form an angle between 70° and 90° to each other.

13. The device of claim 5, wherein the centre line in the light beam from the end region or end regions respectively to the lens system forms an angle of between 45° and 60°.

14. The device of claim 13, wherein the angle is between 45° and 55°.

15. The device of claim 9, wherein the centre lines form an angle between 70° and 90° to each other.

* * * * *